United States Patent [19]

Gergely

[11] Patent Number: 4,560,282
[45] Date of Patent: Dec. 24, 1985

[54] APPARATUS FOR MIXING AND GRANULATING POWDERY SUBSTANCES WITH A SIFTING DEVICE ATTACHED BY MEANS OF A VALVE CLOSURE

[76] Inventor: Gerhard Gergely, Gartengasse 8, A-1053 Vienna, Austria

[21] Appl. No.: 572,964

[22] Filed: Jan. 23, 1984

Related U.S. Application Data

[63] Continuation of Ser. No. 332,066, Dec. 18, 1981, abandoned.

[51] Int. Cl.$^4$ .......................... B01F 7/08; B01F 15/02
[52] U.S. Cl. .................................. 366/134; 366/137; 366/192; 366/238
[58] Field of Search ............... 366/137, 138, 219, 238, 366/239, 224, 134, 136, 185, 189, 192; 209/385, 389

[56] References Cited

U.S. PATENT DOCUMENTS

| | | | |
|---|---|---|---|
| 3,182,966 | 5/1965 | Carlsson | 366/136 |
| 3,820,697 | 6/1974 | Courtney | 366/192 X |
| 3,946,996 | 3/1976 | Gergely | 366/224 X |
| 4,075,713 | 2/1978 | Easton | 366/192 |

Primary Examiner—Robert E. Garrett
Assistant Examiner—Joseph M. Pitko
Attorney, Agent, or Firm—Jordan and Hamburg

[57] ABSTRACT

The present invention is directed to a sifting device that is attached to a granulating apparatus. The sifting device includes a disk valve which can be shut, allowing the sifting device to be cleaned apart from the granulating apparatus, without detaching the sifting device from the granulating apparatus.

4 Claims, 2 Drawing Figures

APPARATUS FOR MIXING AND GRANULATING POWDERY SUBSTANCES WITH A SIFTING DEVICE ATTACHED BY MEANS OF A VALVE CLOSURE

This is a continuation of application Ser. No. 332,066, filed Dec. 18, 1981, now abandoned.

BACKGROUND OF THE INVENTION AND PRIOR ART STATEMENT

The invention relates to an apparatus for mixing and granulating powdered or granular substances with a drum-shaped evacuable vessel comprising a drive shaft arranged in the drum axis with mixing, stirring, and conveying devices, in which the vessel is oscillatable in the vertical plane containing the drum axis and is provided with a cylindrical sieve, or a sifting device which is concentrically housed in a cylindrical body attached to the vessel from the outside and communicates with the vessel in such a way that the lowest inner jacket lines of the vessel and of the cylindrical sieve form an angle of less than 20° while a rotating discharge device is arranged inside of the sieve.

A plurality of procedural steps is required to produce a powdered material from several substances, as required for intermediate and final products in the pharmaceutical, food and cosmetics industries. Depending on the product, these steps comprise dosing, mixing, moistening, granulating, drying, and, in particular, sifting in order to achieve a certain grain size.

U.S. Pat. No. 3,946,996 discloses a general apparatus for mixing and granulating powdered substances which permits the execution of these procedural steps in one and the same apparatus, from mixing up to delivery of the granulate suitable for making tablets in a predetermined composition. There it proposes the attachment of a sieve of cylindrical form in a tubular body on the granulating drum, in which the axes of the circular-cylindrical sieve and of the granulating drum assume a determined angular relationship towards each other.

One problem of the sieve or the sifting device described in that patent is that it will communicate permanently with the interior of the drum after attachment.

For this reason, should the sifting device turn out to be superfluous or hindering while using the apparatus, even only temporarily, then the whole sifting device has to be removed and for instance, be replaced by a blind flange.

Also cleaning of the apparatus described in U.S. Pat. No. 3,946,996 is relatively expensive, requiring undesirable dismantling work.

It is the object of the present invention to improve the existing apparatus in such a way that the sieve or the sifting device can be easily separated from the drum from the outside, without a need for detaching the sifting device in which the entire apparatus should be easy to clean, including the sifting device.

SUMMARY OF THE INVENTION

According to this invention, this object is accomplished by providing a disk valve between the sieve and the container drum that can be activated from the outside, where, in the open position, a sieve and a rotating discharge device communicate with the drum and in the closed position, the sieve is closed against the drum in a vacuum-tight manner; and that a further valve is provided between sieve and outlet.

In a preferred embodiment of the concept of this invention, the disk valve is activated from the outside by means of a screw extending inside the operational axis of the discharge device.

BRIEF DESCRIPTION OF THE DRAWINGS

Further characteristics and advantages of the invention will be apparent from the claims and the description that follows, in which an example of an embodiment is explained in detail making reference to the drawings. In the drawings

DETAILED DESCRIPTION OF A PREFERRED EMBODIMENT

Figure 1:
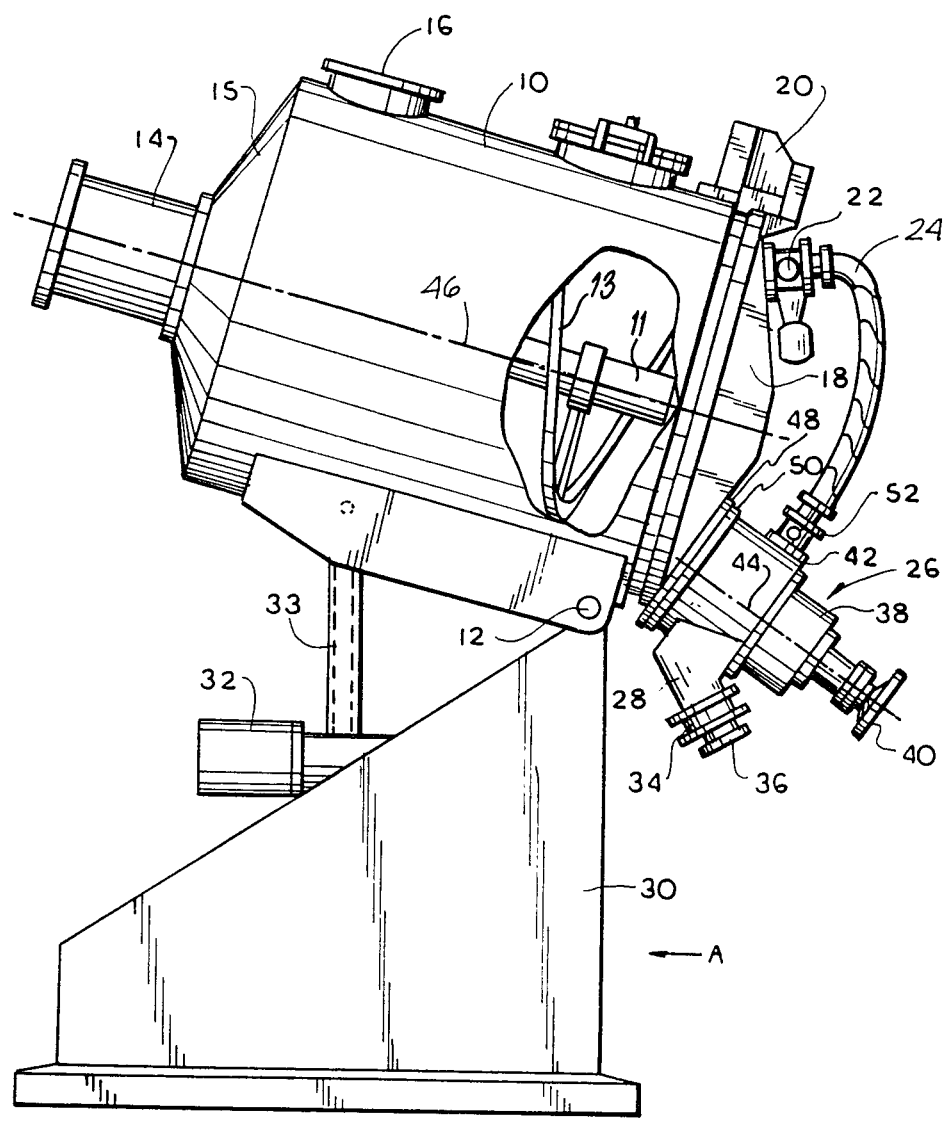
FIG. 1 represents a lateral view of a granulation apparatus according to this invention with an integrated sifting device.

According to FIG. 1, a drum 10 is rotatably hinged on an oscillating axis 12, being supported by a supporting frame 30. A rotary shaft 11 extending into a drum axis 46 is activated by a motor provided at 14. The details of these types of drums, such as their double walling and the furnishing of mixing-, stirring- and screw-conveyors 13 on the shaft 11 are known to the expert; they may, for instance, be taken from U.S. Pat. No. 3,946,996. The cylindrical drum 10 can be oscillated around the horizontally extending axis 12 by means of the swivel drive 32. A lid 18 hinged at 20 on the drum provides access to the drum for cleaning and repair purposes. In the example of the embodiment shown in FIG. 1, lid 18 is provided with a series of devices 22,24 for the feeding or discharging of the drum contents. The drum may be replenished with substance by means of a substance-inlet valve 22; this is preferably achieved through suctioning into the drum vacuum. The apparatus is provided with a connection 16 formed as a flange or the like for a vacuum-producing and controlling system, preferably at the upper end of drum 10 that lies opposite lid 18, which need not be described here in more detail.

Figure 2:
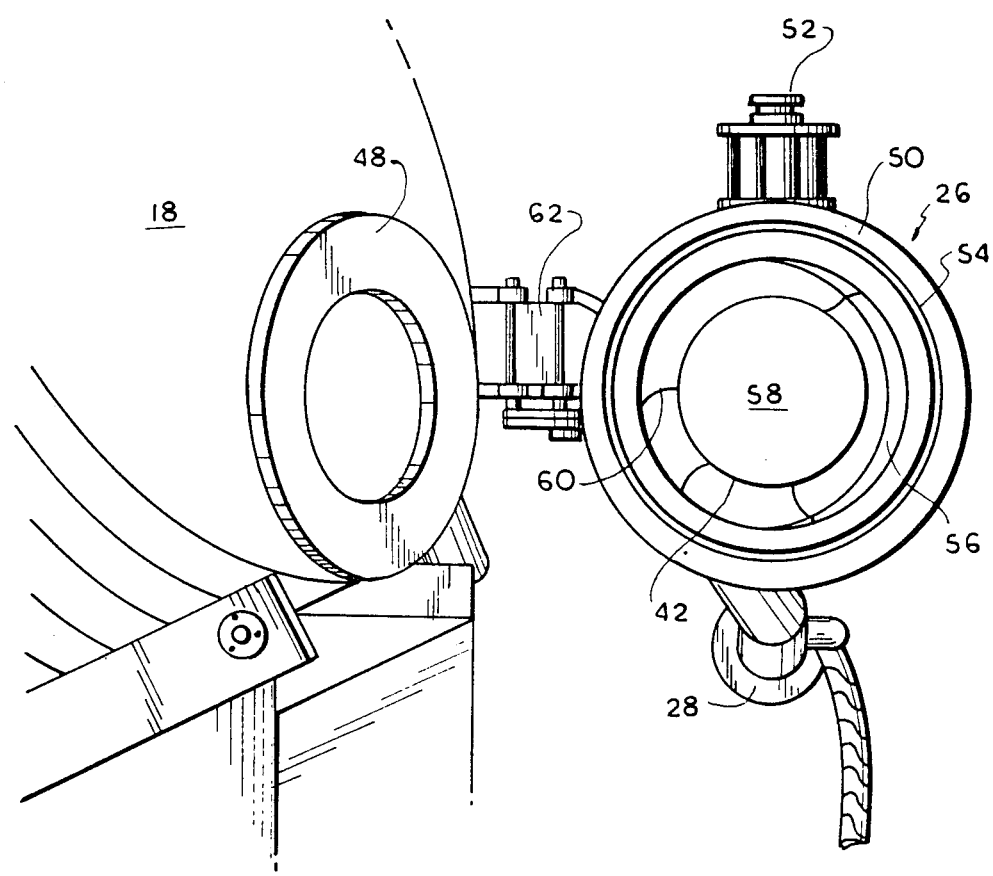
FIG. 2 is a perspective view of the sifting device folded away from the lid of the granulating drum.

A flange 48, provided at the lower end of lid 18, serves as a disk valve seat, onto which the sifting device 26 with a sieve 56 is flanged. FIG. 2 illustrates how the sifting device 26 may be folded out from lid 18 by means of a hinge 62. In the flanged state, a sealing ring 54 provided in flange 50 of sifting device 26 presses against a sealing surface in the disk valve seat 48, locking the inside of the drum and the inside of the sifting device vacuum-tight against the outside atmosphere.

A disk valve 58 is provided in the inside of the sifting device 26 and is movable in the direction of sifting device axis 44. Disk valve 58 is provided with sealing ring 42 on its outer surface, which may be, for example, Viton or another suitable material. If disk valve 58 is moved in the direction of drum 10 by means of a manually or mechanically operated crank drive 40, then the disk valve 58 comes to rest against the disk valve seat 48 and the interior of drum 10 is vacuum-tightly separated from the interior of the sifting device 26 by means of the gasket 42 during granulation. The discharge device 60, rotating by means of a drive 38, is fully described in U.S. Pat. No. 3,946,996.

An outlet 28 for removal of the product is provided in a lower section of the sifting device 26. A valve 34 is disposed at the end of outlet 28; a hose or a container for retrieval of the product may be fastened by flanging to its outlet flange 36.

These procedures according to the invention succeed in allowing the sifting device to remain fastened to the entire granulating apparatus and also make it possible to easily wash the entire equipment including the sifting apparatus. For this, for instance, valve 34 is shut and disk valve 58 is opened, so that drum and sifting device may be filled with water or other cleansing means. Thereafter, all components are started up and the equipment is cleansed. The apparatus according to the invention allows, for instance, pouring the contaminated cleanser into special containers, which might contain poisonous and extremely dangerous substances for instance. Considerable protection of service personnel is thereby obtained.

In case the entire equipment has to be dried after the end of the cleansing process, valve 34 is simply closed in the apparatus of the invention, while disk valve 58 is open, and the entire equipment is evacuated by means of a vacuum pump.

In the upper region of the sifting device 26, an additional filler vent with a flange 52 is disposed, which, in the embodiment of FIG. 1, is short-circuited by hose 24 with valve 22. At normal operation, flange 52 is covered by a blind flange (not shown).

The characteristics of the invention, disclosed in the preceding description, the drawing as well as in the claims may, individually, as well as in any combination, be essential for the implementation of the invention in its various embodiments.

I claim:

1. A device for mixing and granulating powdered or granular substances, comprising an evacuable container having a lid attached thereto for opening and closing the container, mixing, stirring and conveying means situated inside said container for mixing, stirring and conveying the substances in the container, a substance inlet valve connected to the lid of the container for introducing the substances into the container, and a sifting device connected to the lid, said sifting device including a cylindrical body hingedly connected to the lid, said body having a first outlet with an outlet valve for opening and closing the first outlet and a second outlet in fluid communication with the inlet valve, a cylindrical sieve situated inside the body, rotating discharge means situated inside the sieve for discharging the granulated substances in the container from the first outlet through the sieve, and a disk valve situated inside the sifting device for closing the sifting device from the container if necessary.

2. A device according to claim 1, in which said lid of the container includes a flange, and the cylindrical body includes a seal ring so that when the cylindrical body is abutting against the container, the seal ring abuts against the flange to thereby firmly seal therebetween.

3. A device according to claim 2, in which said sifting device further includes means for opening and closing the disk valve so that when the disk valve is closed, the container and the sifting device are completely separated for cleaning.

4. A device according to claim 3, further comprising means for oscillating the container when the container operates to completely mix the substances in the container.

* * * * *